United States Patent Office 3,193,508
Patented July 6, 1965

3,193,508
SILICON-CONTAINING BARIUM-ALUMINUM
GETTER MATERIAL
Paul V. Malloy and Jose P. R. Cels, Lakewood, Ohio, assignors to Union Carbide Corporation, a corporation of New York
No Drawing. Filed July 13, 1962, Ser. No. 209,779
5 Claims. (Cl. 252—181.7)

The invention concerns an improved getter material which is resistant to undesirable reactions with water in both the liquid and vapor form.

The use of active materials for removing residual gas molecules from a vacuum is well known. These active materials, commonly known as getter materials or clean-up agents, adsorb or react with the residual gas molecules when the active materials are vaporized or "flashed." Although many materials which will react with or adsorb the gas molecules are known, a mixture of barium and aluminum is generally preferred as the active material, and indeed is the active material most widely used. In general, the mixture comprises about 40 to 60 weight percent barium and about 60 to 40 weight percent aluminum, with the mixtures containing a higher barium content being more active as a getter material, but less stable in atmospheric conditions as well as other conditions encountered before flashing.

One particular problem with the barium-aluminum mixture is the reactivity of the mixture with water. Getters are almost always exposed to water vapor in the atmosphere during storage and handling, and frequently are exposed to hot water when the vacuum devices in which the getters are attached are washed during their manufacture. In view of these conditions to which getters are subjected, there is a need for a getter material which is highly active, but which is resistant to reaction with water.

The primary object of the invention therefore is to provide a highly active getter material which is resistant to undesirable reaction with water.

Broadly, the object of the invention is achieved by the incorporation of a small amount of silicon in the getter mixture of barium and aluminum. The incorporation of silicon significantly reduces the undesirable reactivity of the barium-aluminum mixture with water, but does not materially affect the activity of the mixture as a getter material. The invention therefore comprises a barium-aluminum getter material containing silicon in an amount effective to reduce the reactivity of the getter material with water. Preferably, the getter material of the invention consists of by weight about 40 to about 60 percent barium, about 30 to about 60 percent aluminum, and about 0.5 to less than 10 percent silicon. If the silicon content is below 0.5 percent, little or no reduction of water reactivity can be detected, and if the silicon content is 10 percent or more, the activity of the getter material is materially reduced. Moreover, a maximum silicon content of about 5 percent is especially preferred since little additional moisture resistance is obtained at higher silicon contents while at the same time the amount of active material present may be reduced.

The preferred getter composition for both high getter activity and high resistance to reaction with water consists of by weight about 55 to about 57 percent barium, about 2 to about 5 percent silicon, and the balance aluminum. This composition corresponds to the usual highly active getter material of 56 percent barium and 44 percent aluminum, but it has markedly reduced reactivity with water as will be shown hereinafter. However, a getter material containing between about 50 and about 57 weight percent barium will be sufficiently active for many applications, the remainder of the getter material consisting of about 2 to 5 percent silicon and the balance aluminum.

The getter material of the invention may be made by melting aluminum in a crucible suitably made of Alundum, silicon carbide, and the like, adding a proper amount of silicon to form a molten solution of the two components, and then adding molten barium to the solution until the proper amount of each ingredient is present. The molten mass is then maintained for a time sufficient to insure a substantially homogeneous mass, and then cooled to form the getter material. All of the operations should be conducted under an atmosphere of an inert gas, such as argon, and the molten materials are preferably maintained at temperatures between 1000° C. and 1150° C. Moreover, all of the ingredients should be in a substantially pure state before mixing, since impurities will in general decrease the activity of the getter material.

After the mass of molten barium, aluminum, and silicon is solidified by cooling, the mass is believed to be an alloy of the three ingredients with no precipitated phase, but whether it is or not has no material effect on the invention. After the mass is cooled to a solid state, the mass is usually ground to a fine powder, e.g., between 65 and 200 United States mesh, and then individual getters are made by pressing an amount of the powder into a tablet or into a container.

The resistance of the getter material of the invention to water is illustrated by the following examples:

EXAMPLE I

An alloy consisting of by weight 50 percent barium, 2.5 percent silicon, and 47.5 percent aluminum was made by adding molten barium to molten aluminum and silicon, all the materials being maintained at a temperature of about 1000° C., and then cooling the mass to room temperature. The thus produced mass was ground to a powder, and the powder was pressed by hand into U-shaped ring containers. A quantity of these getter assemblies was submerged in a closed tank of water, and the pressure increase in the tank was measured by a manometer. Since the pressure increase is proportional to the amount of hydrogen evolved from the reaction of the barium-aluminum mixture with water, the pressure rise indicates the amount of reaction which proceeds, and thereby the reactivity of the getter material. The pressure increase in this instance was much lower than the pressure increases observed in the same tests on 50–50 barium-aluminum getter materials.

EXAMPLE II

A mixture containing by weight 55 percent barium and 45 percent aluminum was alloyed with several different amounts of silicon according to the procedure indicated in Example I. The alloys were pressed into ring containers, and their reactivity with water was tested. Results of the water sensitivity tests, which consisted of immersing a quantity of like getter material into water in a closed tank and then measuring the pressure increase by a manometer, are shown in Table I on the alloys thus produced.

Table I.—Rate of reaction of Ba-Al-Si alloys with water

| Barium-aluminum mixture, weight percent | | Weight percent silicon added to mixture | Change in manometer divisions by time | | |
|---|---|---|---|---|---|
| Ba | Al | | 1 min. | 5 min. | 10 min. |
| 55 | 45 | None | 3 | 53 | 97 |
| 55 | 45 | 1.3 | 3 | 32 | 70 |
| 55 | 45 | 2 | 4 | 39 | 59 |
| 55 | 45 | 3 | 1 | 13 | 33 |
| 55 | 45 | 5 | 1 | 7 | 18 |

These results show that the water sensitivity of the getter material of the invention is significantly lower than a corresponding getter materail without silicon. Moreover, the yield of barium flashed from the alloy containing 3 percent silicon was determined and was found to be normal.

EXAMPLE III

In an argon atmosphere of reduced pressure, commercial barium was distilled at a temperature of about 990° C. to remove most of the impurities, and was collected in an iron crucible. Aluminum was melted in an Alundum crucible, or in a few instances a silicon carbide crucible, and silicon was added to the molten aluminum. After the silicon dissolved, the distilled molten barium was added to the molten solution of aluminum and silicon. The molten ingredients were maintained at a temperature of 1100° for a short period, and then cooled to form a slug. The slug was ground to a 65/200 United States mesh powder and was then pressed into individual container rings at 8000 pounds per square inch pressure. About 200 milligrams of powder were pressed into each ring, and five rings containing like material were dropped into 25 milliliters of distilled water in a closed system of about 132 cubic centimeters volume. The pressure rise in the system, due to evolved hydrogen, was measured with a manometer. Results of the tests for various compositions of the alloy are shown in Table II after converting the pressure rise to milligrams of hydrogen.

*Table II.—Rate of reaction of Ba-Al-Si getter material with water*

| Alloy tested (nominal) (wt. percent) | | | Crucible used | Hydrogen evolved (mg.) | | |
|---|---|---|---|---|---|---|
| Ba | Al | Si | | 1 min. | 5 min. | 10 min. |
| 56 | 44 | None | Alundum | 0.02 | 0.47 | 0.85 |
| 56 | 44 | None | Silicon | 0.02 | 0.61 | 0.91 |
| 55.8 | 43.7 | 0.5 | Alundum | 0.02 | 0.48 | 0.81 |
| 55.4 | 43.3 | 1.3 | ----do---- | 0.02 | 0.28 | 0.62 |
| 55 | 43 | 2 | ----do---- | 0.03 | 0.34 | 0.52 |
| 54.4 | 42.6 | 3 | ----do---- | 0.02 | 0.11 | 0.26 |
| 54.4 | 42.6 | 3 | Silicon carbide. | 0.02 | 0.17 | 0.29 |
| 53.3 | 41.7 | 5 | Alundum | 0.02 | 0.06 | 0.16 |

The results show that the addition of silicon to the barium-aluminum alloy markedly reduces the rate of reaction with water.

EXAMPLE IV

Several different alloys of barium, aluminum, and silicon were prepared in accordance with the procedure described in Example III. Five getter rings were made with each alloy by pressing 200 milligrams of alloy powder into a U-shaped ring container. These five rings were immersed in 25 milliliters of distilled water in a closed system at room temperature, and the hydrogen evolved was measured by the pressure increase followed by conversion to milligrams of hydrogen. These data are shown in Table III.

These results indicate that the barium content should be maintained at less than 57 weight percent to maintain low reactivity with water, and preferably at about 57 percent and below to minimize this reactivity while maintaining a highly active barium getter. Furthermore, the results indicate that at a silicon content of above about 5 weight percent, substantially no advantage is gained over a getter material with a silicon content of 5 percent. In addition, at silicon contents above about 5 percent there is evidence that silicon tends to precipitate from the alloy, thereby causing an uneven distribution of silicon in the getter material. If precipitation does occur, the effectiveness of the silicon present may be reduced, but in any event the reactivity of the getter material with water would still be lower than the same getter material without silicon.

It is believed that the corrosion resistance of the getter material of the invention is due to a thin protective film of silicon which forms on the surface of the material after exposure to water, but as the above tests results indicate, the getter material of the invention significantly reduces the reactivity of the material with water whether or not this theory is completely correct.

What is claimed is:

1. In a method for the production of a substantially homogeneous barium-aluminum getter material which comprises melting a mixture of barium and aluminum and then cooling the molten mixture, the improvement which comprises adding to said mixture of barium and aluminum prior to cooling from about 0.5 weight percent to less than 10 weight percent silicon, said silicon reducing the reactivity of the barium-getter material with water.

2. In a method for the production of a substantially homogeneous barium-aluminum getter material which comprises melting a mixture of barium and aluminum and then cooling the molten mixture, the improvement which comprises adding to said mixture of barium and aluminum prior to cooling from about 2 weight percent to about 5 weight percent silicon, said silicon reducing the reactivity of the barium-aluminum getter material with water.

3. A substantially homogeneous getter material relatively resistant to reaction with water, said getter material consisting of by weight about 40 percent to about 60 percent barium, about 30 percent to about 60 percent aluminum, and from about 0.5 to less than 10 percent silicon.

4. A substantially homogeneous getter material relatively resistant to reaction with water, said getter material consisting of by weight about 50 to about 57 percent barium, about 2 to about 5 percent silicon, and the balance aluminum.

5. A substantially homogeneous getter material having high getter activity and having resistance to reaction with water, said getter material consisting of by weight about 55 to about 57 percent barium, about 2 to about 5 percent silicon, and the balance aluminum.

References Cited by the Examiner

UNITED STATES PATENTS

| 1,952,717 | 3/34 | Anton | 252—181.7 |
| 1,963,829 | 6/34 | Cooper | 252—181.7 |
| 1,979,506 | 11/34 | Umbreit | 252—181.7 |
| 2,100,746 | 11/37 | Miller et al. | 252—181.7 |

MAURICE A. BRINDISI, *Primary Examiner.*

*Table III.—Rate of reaction of Ba-Al-Si alloy with water*

| Nominal Ba/Al Ratio | Percent Si Added | Chemical analysis | | Hydrogen evolved | | |
|---|---|---|---|---|---|---|
| | | Percent Ba | Percent Al | 1 min. | 5 min. | 10 min. |
| 60/40 | 3 | 55.6 | 41.2 | 0.02 | 0.11 | 0.27 |
| 60/40 | 3 | 56.9 | 40.4 | 0.06 | 0.39 | 0.62 |
| 62.5/37.5 | 3 | 59.5 | 37.9 | *high | | |
| 62.5/37.5 | 6 | 59.0 | 35.1 | *high | | |
| 65/35 | 3 | | | >0.88 | | |

*Samples bubbled vigorously; quantitative measurements were not made.